(12) United States Patent
Moon et al.

(10) Patent No.: US 11,035,742 B2
(45) Date of Patent: Jun. 15, 2021

(54) WIRED TEMPERATURE PROBE FOR COOKING APPLIANCE

(71) Applicant: NuWave, LLC, Libertyville, IL (US)

(72) Inventors: Jung S. Moon, Long Grove, IL (US); Byung Gab Choi, Lake Villa, IL (US); James Moon, Vernon Hills, IL (US); Li Xiang Jun, Foshan (CN); Zeng Qing Ping, Shanwei (CN); Kim Jong Rok, Seoul (KR); Luo Fei, Foshan (CN)

(73) Assignee: NuWave, LLC, Vernon Hills, IL (US)

( * ) Notice: Subject to any disclaimer, the term of this patent is extended or adjusted under 35 U.S.C. 154(b) by 158 days.

(21) Appl. No.: 16/135,216

(22) Filed: Sep. 19, 2018

(65) Prior Publication Data
US 2020/0088588 A1    Mar. 19, 2020

(51) Int. Cl.
| | |
|---|---|
| *G01K 1/00* | (2006.01) |
| *G01K 13/00* | (2021.01) |
| *G01K 7/00* | (2006.01) |
| *H05B 1/02* | (2006.01) |
| *H05B 6/64* | (2006.01) |
| *G01K 1/16* | (2006.01) |
| *G01K 7/16* | (2006.01) |
| *H05B 6/68* | (2006.01) |
| *H05B 6/06* | (2006.01) |
| *H05B 6/12* | (2006.01) |

(52) U.S. Cl.
CPC ............... *G01K 13/00* (2013.01); *G01K 1/16* (2013.01); *G01K 7/16* (2013.01); *H05B 1/0258* (2013.01); *H05B 6/645* (2013.01); *H05B 6/68* (2013.01); *G01K 2207/02* (2013.01); *H05B 6/06* (2013.01); *H05B 6/12* (2013.01); *H05B 2213/00* (2013.01)

(58) Field of Classification Search
USPC ................ 374/149, 155, 170, 208, 141, 183
See application file for complete search history.

(56) References Cited

U.S. PATENT DOCUMENTS

| | | | | | |
|---|---|---|---|---|---|
| 2,510,526 | A | * | 6/1950 | Smith ................ | G05D 23/1909 99/331 |
| 2,657,580 | A | * | 11/1953 | Schroeder ................ | G01K 7/34 374/183 |

(Continued)

*Primary Examiner* — Mirellys Jagan
(74) *Attorney, Agent, or Firm* — Bishop, Diehl & Lee, Ltd.

(57) ABSTRACT

A cooking control system having a temperature probe and a cooking appliance is described for permitting temperature target cooking of foods. The probe includes a metallic insertable portion with a sheathed tip and a temperature sensor positioned therein, a flexible heat-resistant wire coupled to the temperature sensor, and a jack coupled to the flexible, heat-resistant wire opposite the metallic insertable portion. The cooking appliance includes a heating unit, an housing, a temperature reader, and an alpha-numerical display. In use, the temperature sensor produces a signal in response to a temperature sensed at the sheathed tip and the heat-resistant wire and jack transmit the signal produced by the temperature sensor to the port of the cooking appliance. The temperature reader within the housing is coupled to the port and configured to accept and accurately convert the signal produced by the temperature sensor to a number representing the temperature sensed by the sensor and display the number for the user.

12 Claims, 5 Drawing Sheets

(56) References Cited

U.S. PATENT DOCUMENTS

| | | | | |
|---|---|---|---|---|
| 2,858,699 A | * | 11/1958 | Scofield | G01K 13/10 |
| | | | | 374/155 |
| 4,038,510 A | * | 7/1977 | White | G12B 17/02 |
| | | | | 219/712 |
| 4,081,645 A | * | 3/1978 | Javes | G01K 13/00 |
| | | | | 219/516 |
| 4,122,322 A | * | 10/1978 | Ohkubo | G01K 3/005 |
| | | | | 219/712 |
| 4,291,576 A | * | 9/1981 | Deane | G01K 1/08 |
| | | | | 338/28 |
| 4,967,049 A | * | 10/1990 | Kaneshiro | G01K 1/00 |
| | | | | 219/712 |
| 5,043,547 A | * | 8/1991 | Lee | H05B 6/6411 |
| | | | | 219/712 |
| 8,931,400 B1 | * | 1/2015 | Allen | A47J 36/00 |
| | | | | 99/344 |

* cited by examiner

WIRED TEMPERATURE PROBE FOR COOKING APPLIANCE

TECHNICAL FIELD OF THE INVENTION

The present invention relates to temperature control devices. Specifically, the disclosed device relates to temperature controls for cooking appliances. More specifically, the invention relates to temperature probes.

BACKGROUND OF THE INVENTION

Some people have been led to believe that visible indicators, such as color changes, can be used to determine if foods are cooked to a point where pathogens are killed. However, research has shown that color and texture indicators are actually unreliable for many foods. For example, ground beef may turn brown before it reaches a sufficient temperature where pathogens are destroyed. A consumer preparing hamburger patties and using the brown color as an indicator of "doneness" is taking a chance that pathogenic microorganisms may survive, particularly in the interior of the burger. Conversely, a hamburger cooked to 160° F., as measured with a meat thermometer, regardless of color, is safe.

Using a food thermometer is the only reliable way to ensure safety and to determine desired "doneness" of meat, poultry, and egg products. To be safe, these foods must be cooked to a safe minimum internal temperature to destroy any harmful microorganisms that may be in the food. "Doneness" refers to when a food is cooked to a desired state and indicates the sensory aspects of foods such as texture, appearance, and juiciness. Unlike the temperatures required for safety, these sensory aspects are subjective.

The problem, however, is that present day cooking thermometers require constant monitoring. If an individual becomes distracted by other cooking needs, the food to be monitored can easily be overcooked. Further, probes which stay in foods during cooking cannot always be readily seen from the exterior of the cooking appliance. Similarly, some probes must be inserted and removed to avoid inaccuracies. Each of these issues requires repeated opening of a cooking appliance to check the internal temperature of the food. This problem is made even greater in small, countertop cooking appliances, as the heat loss from repeated openings can greatly impact cooking times and food quality.

The invention of the present disclosure solves the above problems. In fact, until the invention of the present application, these and other problems in the prior art went either unnoticed or unsolved by those skilled in the art. The present invention provides a wired temperature probe which performs multiple functions with an associated cooking appliance without sacrificing portability features, design, style or affordability.

SUMMARY OF THE INVENTION

There is disclosed herein a cooking control system and a wired electronic temperature probe, as well as a method for cooking using the system and probe. The inventive system, probe and method are used with a cooking appliance and combined avoid the disadvantages of prior devices, systems and methods while affording additional structural and operating advantages.

Generally speaking, the cooking control system comprises a temperature probe having a metallic insertable portion with a sheathed tip and a temperature sensor positioned therein, a flexible heat-resistant wire coupled to the temperature sensor, and a jack coupled to the flexible, heat-resistant wire opposite the metallic insertable portion, and a cooking appliance having a heating unit, an housing, a temperature reader, and an alpha-numerical display.

In a preferred embodiment, the temperature sensor produces a signal in response to a temperature sensed at the sheathed tip and the heat-resistant wire and jack transmit the signal produced by the temperature sensor to the port of the cooking appliance. The temperature reader within the housing is coupled to the port and configured to accept and accurately convert the signal produced by the temperature sensor to a number representing the temperature sensed by the sensor and display the number for the user.

In specific embodiments, the system further comprises control circuitry within the cooking appliance and connected to both the temperature reader and the heating unit. The control circuitry operates the heating unit in response to the signal from the temperature sensor.

Preferably, the port is positioned on an exterior of the cooking appliance housing, but may be positioned on an interior surface of the heating unit.

As to the temperature probe, it is preferably used in combination with a cooking appliance having a control system for alerting a user when a cooking event is complete. Generally speaking, the temperature probe comprises a metallic insertable portion having a sheathed tip and a temperature sensor positioned therein, a flexible heat-resistant wire coupled to the temperature sensor within the metallic insertable probe portion, and a jack coupled to the flexible, heat-resistant wire opposite the metallic insertable probe portion. The heat-resistant wire and jack transmit the signal produced by the temperature sensor to the cooking appliance.

These and other aspects of the inventions may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-8, there is illustrated a cooking control system, generally designated by the numeral 10, and an electronic wired temperature probe, designated by the numeral 12. The particular illustrated cooking control system 10 is for use with a cooking appliance, such as an oven, microwave, grill, and the like. In fact, while all the embodiments illustrated are directed to a countertop appliance, it should be understood that the principles of the invention can be more broadly applied to most any automated cooking appliance, as long as it can incorporate the control features of the following disclosure.

Figure 1:
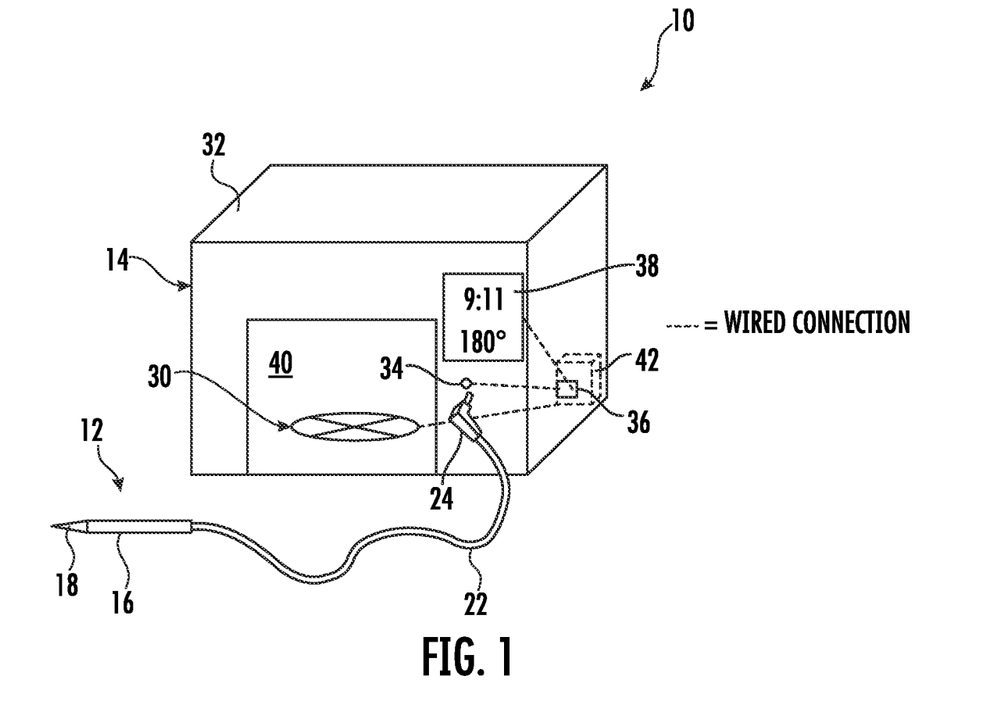
FIG. 1 is a general schematic illustrating an embodiment of the disclosed temperature cooking system.
Figure 2A:
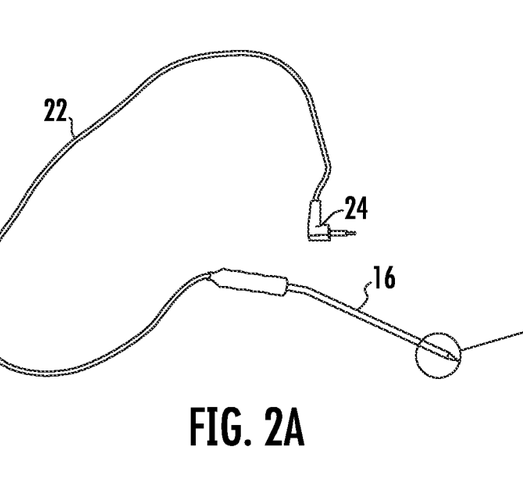
FIG. 2A shows an embodiment of a wired temperature probe in accordance with the present disclosure.
Figure 2B:
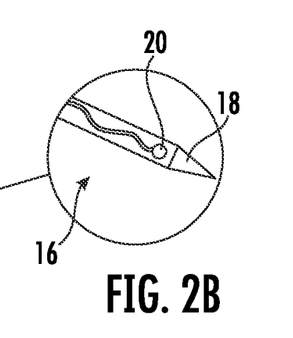
FIG. 2B is a cutaway view of the sheathed tip of the temperature probe of FIG. 2A to show the internal temperature sensor.

As can be seen in FIGS. 1 and 2A & B, the cooking control system 10 is comprised of two main components: a temperature probe 12 connectable to a cooking appliance 14. The temperature probe 12 is comprised of a metallic insertable portion 16 having a sheathed tip 18 and a temperature sensor 20 positioned therein, and a flexible heat-resistant, coated wire 22 coupled to the temperature sensor 20 within the metallic insertable portion 16. A jack 24 is coupled to the flexible, heat-resistant wire 22 opposite the metallic insertable portion 16 is used to connect to the cooking appliance 14.

The cooking appliance 14 comprises a heating unit 30 for cooking foods, a housing 32 containing the heating unit 30 and having a port 34 configured to allow insertion of the jack 24, a temperature reader 36 within the housing 32 is coupled to the port 34, and a display 38 on an outer front surface of the housing 32. Preferably, the port 34 and display 38 are positioned on an exterior surface of the cooking appliance 14. However, the port 34 may be positioned within a cooking chamber 40 for some applications.

The temperature reader 36 is preferably part of control circuitry 42 which is configured to accept and accurately convert a signal produced by the temperature sensor 20 to a number representing the temperature sensed by the sensor 20. In a preferred embodiment, the temperature sensor is comprised of a bimetallic temperature sensor. In an alternate embodiment, the temperature sensor is comprised of a thermistor.

The probe 12 allows food to be cooked to a specific internal temperature. That is, once the internal temperature of the food material reaches a programmed threshold as sensed by the probe 12, the cooking appliance may be automatically shut off and even emit a signal to alert the user. For most cooking applications, the probe 12 has a temperature range of about 100° F. to about 210° F. (about 37° C. to 100° C.). It may have a default cooking temperature as well. Preferably the default is about 160° F. (about 70° C.).

In use, the metallic insertable portion 16 of the probe 12 is connected via the jack 24 to the cooking appliance 14 and the sheathed tip 18 is inserted into an uncooked (or undercooked) food material (not shown). The food is then placed into the cooking chamber 40. A desired cooking process can then be programmed into the cooking appliance 14, as described below. As the heating unit 30 of the appliance 14 cooks the food material, the temperature sensor 20 within the probe 12 generates and transmits a signal through the heat-resistant wire 22, jack 24 and into the temperature reader 36 of the control circuitry 42. The temperature reader 36 converts the signal to a number representing the temperature (in either ° F. or ° C.) sensed at the sheathed tip 18 of the probe 12 by the temperature sensor 20. The number is then transmitted to a display 38. Preferably, the display 38 is on an exterior surface of the housing 32.

Figure 3:
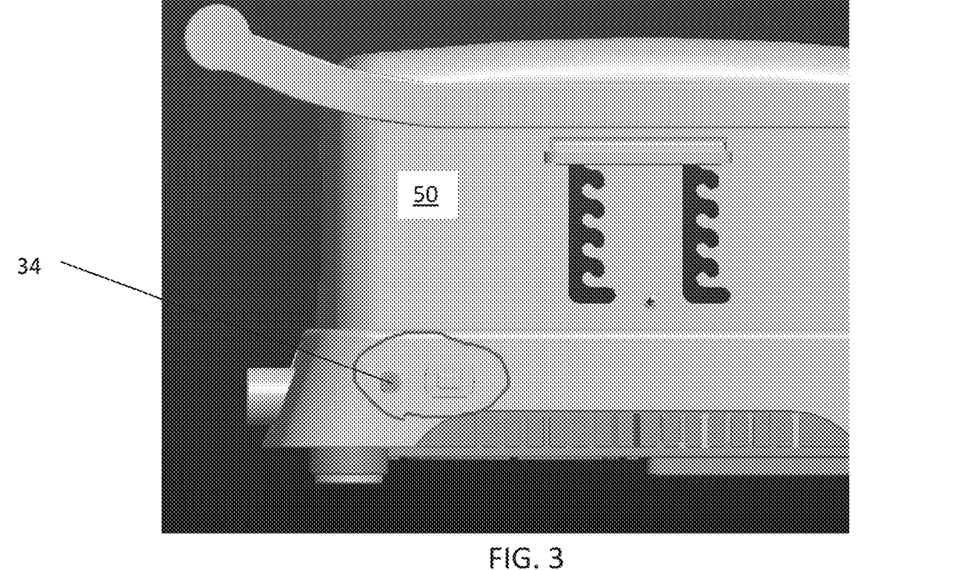
FIG. 3 is a side view of a countertop grill having a port for a wired temperature probe.
Figure 4:
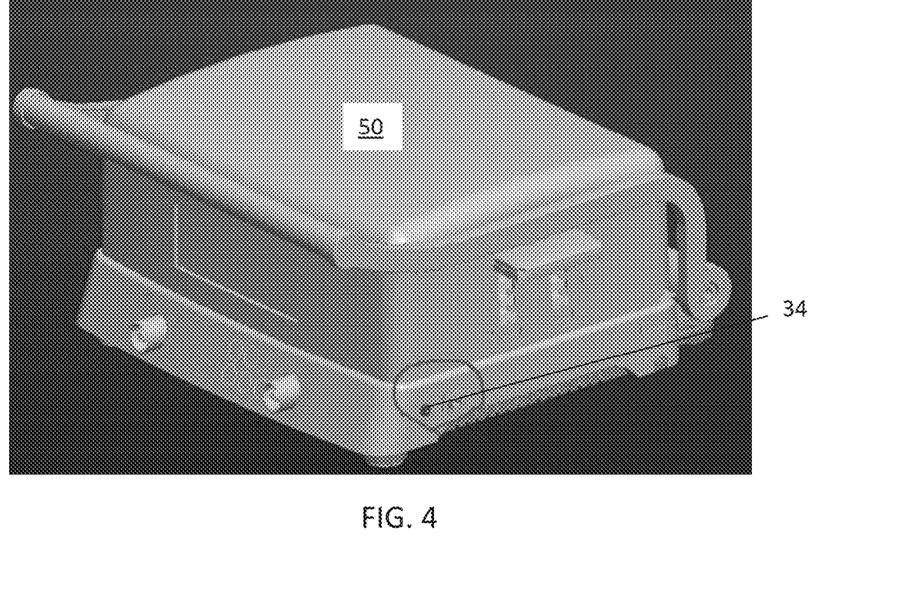
FIG. 4 is a perspective view of the countertop grill of FIG. 2.
Figure 5:
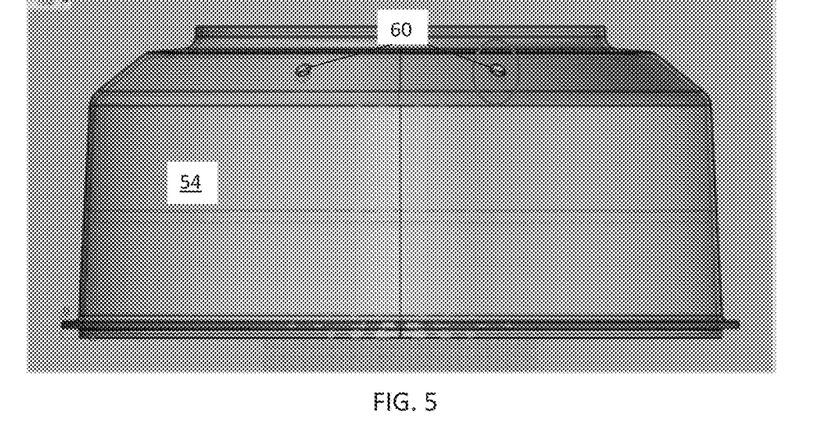
FIG. 5 is a side view of a dome lid for a countertop electric convection oven having steam vents and probe opening.
Figure 6:
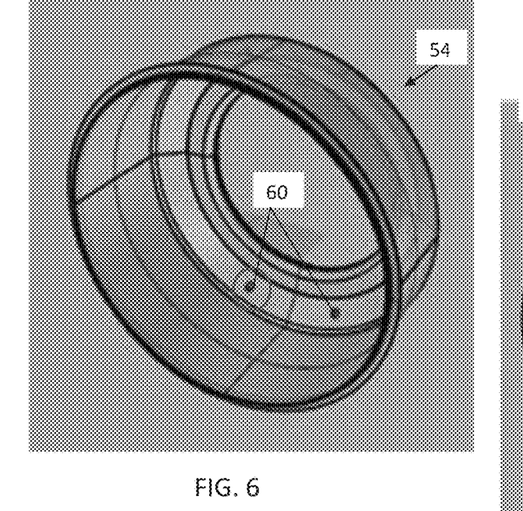
FIG. 6 is a bottom view of the dome lid of FIG. 4.
Figure 7:
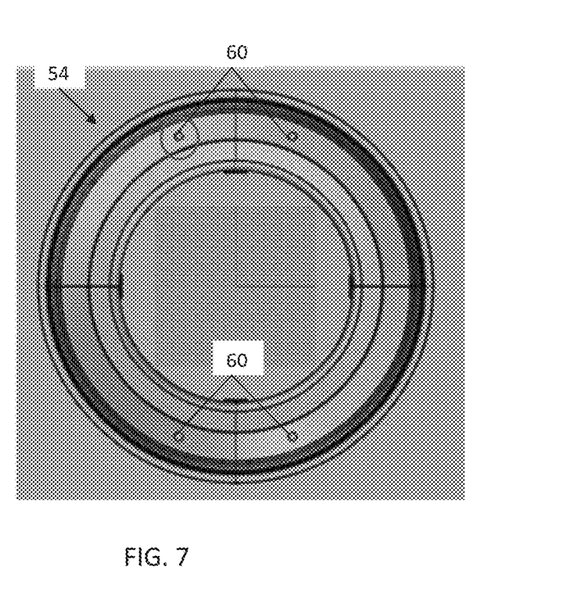
FIG. 7 is a top view of the dome lid of FIG. 4.
Figure 8:
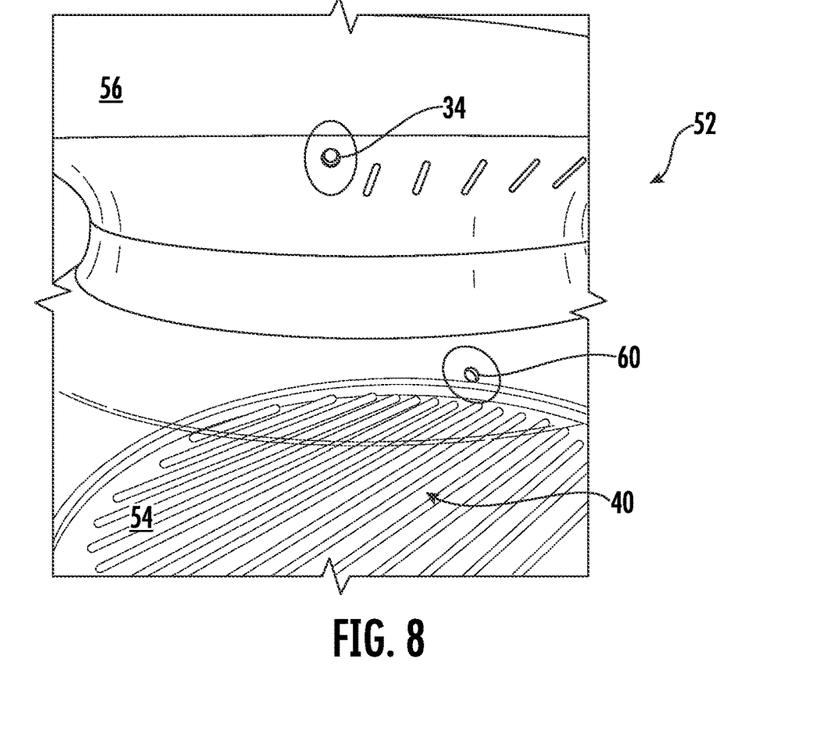
FIG. 8 is side view of an embodiment of a countertop convection oven showing a probe port and a probe opening.

FIGS. 3-9 feature different cooking appliances which may be used with a wired temperature probe 12 of the present disclosure. In FIGS. 3 and 4, a double grill 50 is shown having a port 34 positioned on an exterior surface. The grill 50 opens by lifting the handle to expose upper and lower grilling surfaces (not shown). A gap between the surfaces allows a food material (not shown) to be place in the created space for cooking. An opening (not shown) in the housing allows the wire portion 22 of the probe 12 to pass through to connect the jack 24 to the port 34.

Referring to FIGS. 5-8, a countertop electric convection oven 52 is illustrated, and particularly the dome lid 54 of the oven. As shown, a port 34 is positioned on an exterior surface of the power head 56 of the oven 52 and a plurality of openings 60 on the periphery of the lid 54 permit the probe 12 to connect to the port 34 while inside the cooking chamber 40. The multiple openings 60 allow the port 34 to be proximate at least one opening regardless of attachment of the power head 56. The unused openings serve as steam vents for the cooking chamber 40.

Figure 9:
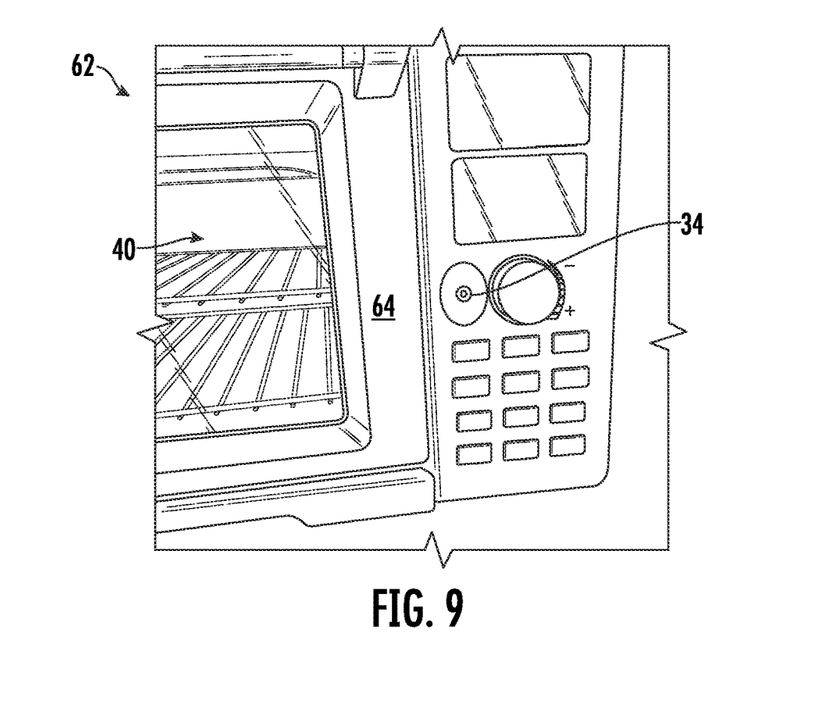
FIG. 9 is a front view of a countertop oven having a probe port.

With reference to FIG. 9, a programmable toaster oven 62 is shown. A port 34 positioned on the front exterior surface of the oven 62 allows connection of the wired probe 12. Again, an opening (not shown) in the oven door 64 permits the probe to pass into the cooking chamber 40 while in use.

Figure 10:
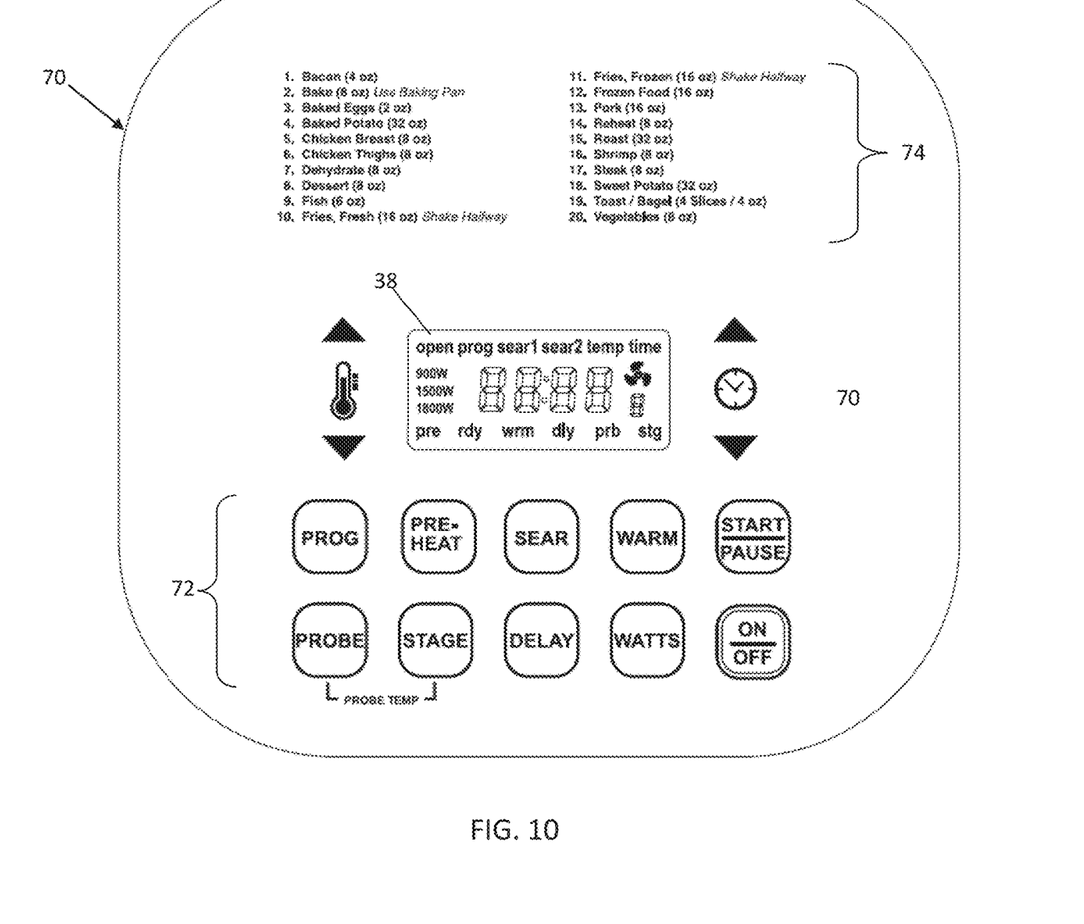
FIG. 10 is a schematic of an embodiment of a control panel for a cooking appliance.

Finally, with reference to FIG. 10, a control panel 70 for a cooking appliance is illustrated. The control panel 70 illustrates just one possible embodiment of a user input panel having input buttons 72 and a display 38. A list of pre-programmed settings 74 may also be provided. Cooking with the probe 12 can also be accommodated by the control panel 70.

The following is an example programming sequence for the illustrated control panel 70 on a convection oven cooking appliance.

Example Cooking and Programming Steps for Probe Use:
1. Press [ON/OFF], display shows "360 F", "temp" (default oven temperature);
2. Press [up/down arrow] buttons by temperature symbol until desired oven temperature is displayed;
3. Press [PROBE], display illuminates "prb" and "160 F" is shown (as default temperature);
4. Press [up/down arrow] buttons by temperature symbol until desired probe temperature is displayed;
5. Connect probe jack to the port and insert sheathed tip into food;
6. Place food with probe into oven; and
7. Push [START/PAUSE].

Cooking will begin and continue until desired probe temperature is registered by control circuitry 42. During cooking, the display 38 will show updated probe temperature when "prb" is also illuminated.

The following example programming steps may be used to check or alter the programmed cooking sequence for the illustrated control panel 70 on the convection oven cooking appliance.

Example Programming:
During cooking, pressing [up/down arrow] buttons above and below temperature symbol will display the chosen temperature of the oven (default 360 F);

Pressing [up/down arrow] buttons above and below time symbol will display remaining cooking time. [Note: when the probe temperature is not being displayed, "prb" is not illuminated];

Pressing [PROBE] and [STAGE] buttons at the same time will display the set temperature of the probe. The user can adjust desired probe temperature by using the [up/down arrow] buttons above and below temperature symbol as described above;

User can switch from probe temperature cooking to a timed cooking by pressing [up/down arrow] buttons above and below time symbol.

In addition to the above possible and exemplary programming steps, the following exemplary functions may also be programmed into the control circuitry of the cooking appliance.

Functionality:
If desired cooking time is finished but desired probe temperature is not achieved, cooking will continue until probe temperature is achieved.

Example

Probe Temperature set at 200° F.
REGULAR COOKING set at 380° F. for 5 min
SEAR COOKING set at 400° F. for 2 min
WARM set at 140° F. for 30 min In the above example, if probe temperature of 200° F. is not achieved by the end of the "Regular Cooking" cycle (i.e., 380° F., 5 min), then programming will go to "Sear Cooking" cycle (i.e., 400° F., 2 mins). If the probe temperature is still not achieved, then programming will go back to regular cooking (380° F.) to continue until the temperature is achieved. At that point, the programming will then go to warm. Meanwhile, if the user presses the [up/down arrows] proximate the clock symbol, "00:00" will be displayed as the remaining time, as preset cooking time has run out.

Additionally, if the set cooking temperature is lower than the target probe temperature, "Err" will display with three short beeps when "Start/Pause" button is pressed. This will indicate an error has occurred and cooking will not start.

If cooking is started without insertion of the probe 12 into the food, a probe temperature cycle can still be used. To do this, the probe 12 is inserted and the [PROBE] button is pressed to display the probe temperature. The programming will recognize the probe 12 and begin to cook to the default setting temperature (preferably 160° F.). To adjust the target probe temperature, the [PROBE] and [WARM] buttons should be pushed simultaneously. If the probe 12 is unplugged during cooking and user pushes the [PROBE] button, "prb" will illuminate with a beeping sound. If at any time during cooking the probe 12 is unplugged, the probe temperature cooking function is cancelled. To restore probe temperature cooking, the probe 12 should be plugged back in and the [PROBE] button pressed to restart cooking.

To avoid an unsafe cooking statuses, the control circuitry should be configured to be shut off in at least the following scenarios:

a. target cooking temperature is more than 250° F. and the probe sensing temperature does not increase more than 5° F. during the first 60 minutes of cooking; and b. target cooking temperature is less than 250° F. and the probe sensing temperature does not increase more than 5° F. during the first 120 minutes of cooking.

When the cooking appliance 14 goes into shut-off, the "prb" indicator should be lit as error notice. Additionally or alternately, a beeping noise can be activated.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A cooking control system for use with a cooking appliance, the system comprising:
   a temperature probe comprising:
      a metallic insertable portion having a sheathed tip and a temperature sensor positioned therein, wherein the temperature sensor produces a signal in response to a temperature sensed at the sheathed tip;
      a flexible heat-resistant wire coupled to the temperature sensor within the metallic insertable portion; and
      a jack coupled to the flexible, heat-resistant wire opposite the metallic insertable portion, wherein the heat-resistant wire and jack transmit the signal produced by the temperature sensor; and
   a cooking appliance comprising:
      a heating unit for cooking foods;
      a housing containing the heating unit and having a port configured to allow insertion of the jack;
      a temperature reader within the housing, coupled to the port and configured to accept and accurately convert the signal produced by the temperature sensor to a number representing the temperature sensed by the sensor;
      control circuitry connected to both the temperature reader and the heating unit, wherein the control circuitry operates the heating unit in response to the signal from the temperature sensor; and
      a display on the housing of the cooking appliance for displaying the number.

2. The system of claim 1, wherein the port is positioned on an exterior of the cooking appliance housing.

3. The system of claim 1, wherein the port is positioned on an interior surface of the heating unit.

4. The system of claim 1, wherein the temperature sensor is a bimetallic sensor.

5. The system of claim 1, wherein the temperature sensor is a thermistor.

6. The system of claim 1, wherein the port is positioned within a cooking chamber of the cooking appliance.

7. The system of claim 1, wherein the display is digital.

8. The system of claim 1, wherein the cooking appliance further comprises a cooking chamber within the housing and coupled to the heating unit, wherein the metallic portion of the probe is positioned within the cooking chamber in use and the flexible, heat-resistant wire passes from an interior of the cooking chamber to an exterior of the cooking chamber.

9. The system of claim 8, wherein the port is positioned outside the cooking chamber of the cooking appliance.

10. The system of claim 1, further comprising an annunciator which is activated when the reader receives a signal of a threshold value.

11. The system of claim 10, wherein the annunciator is audible.

12. The system of claim 10, wherein the annunciator is visual.

\* \* \* \* \*